April 11, 1961 J. BOSCH 2,979,619
IONIZATION CHAMBER CIRCUITRY WITH
TEMPERATURE COMPENSATION
Filed Dec. 6, 1955
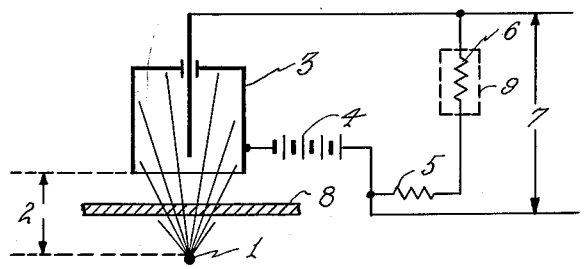
INVENTOR.
BY Julius Bosch
Orin R. Severn
his ATTORNEY > United States Patent Office 2,979,619
Patented Apr. 11, 1961

2,979,619

IONIZATION CHAMBER CIRCUITRY WITH TEMPERATURE COMPENSATION

Julius Bosch, Erlangen-Bruck, Germany, assignor to Frieseke and Hoepfner, G.m.b.H., a corporation of Germany Filed Dec. 6, 1955, Ser. No. 551,403

Claims priority, application Germany Dec. 7, 1954

10 Claims. (Cl. 250—83.6)

This invention relates to equipment for measuring the absorption of a radiation intensity emitted by a radioactive radiator and radiated in a certain direction. Such equipment is well known in technical fields and used as thickness gages for continuously measuring the thickness of passing (transported) flat material, such as plastic foils, paper sheets, rolling mill products etc. Precision measurement by the equipment is essential to a proper installation. Such equipment must therefore be very sensitive, and as a result is easily affected by outside influences. In non-contact measurements, such an influence is for example the column of air between the radioactive radiator and the radiation receiver (ionization chamber). The column of air, which measures a certain weight per unit area, as any other material, is subject to certain changes under the influence of the atmospheric (surrounding) temperature. Such changes affect the measurements. With very sensitive measurements, especially in cases where the weight per unit area lies below 100 g./cm.$^2$, we find that such weight per unit area changes of the air column due to temperature influences are liable to become very disturbing factors which greatly impair the accuracy of the measurements. This may even occur immediately after adjustment of the equipment. Only in very rare cases do the same temperature conditions prevail at the measuring point as at the point of adjustment.

Basically, there are three methods for making radiation intensity measurements with standard equipment using an ionization chamber. The first method utilizes the charge or discharge of a condenser via the ionization chamber. The second method measures the ionization current, and in the third method impulses are counted. The first method operates on the theory that a condenser is charged or discharged by the ionization current which flows through the ionization chamber. By measuring the speed of this process, a measurement is obtained showing the intensity of the radiation effect. The main difference between the second method and the first is that in the second method the ionization chamber current flows through a resistor of large resistance. The voltage drop which occurs across this resistor is then measured which drop represents a measured value for the radiation intensity penetrating the ionization chamber. The third method employs a proper device for counting the impulses which are generated by the penetrating rays. The impulse rate per time unit again represents a measurement of the radiation intensity.

In a common ionization chamber application, as for instance in beta-ray thickness gages, we find the ionization chamber used in combination with a radioactive substance, in order to measure the radiation absorption affected by a material for which the weight per unit area or the thickness is to be determined. In the selected example not only does the material to be measured act as an absorber, but also the column of air in the radiation path from the radiation source to the ionization chamber. Of course absorption by the air column influences the measurement. Atmospheric pressure changes are of no effect within the ionization chamber if it is properly sealed. However, changes in the density of the air layer between the ionization chamber and the radiation source due to atmospheric temperature changes cannot be avoided.

Thus with an increase in ambient temperature air density is reduced, absorption by the air column is reduced, the radiation received by the ionization chamber is increased, and the ionization current is increased. Insofar as circuitry connected to the ionization chamber is concerned, the equivalent impedance of the ionization chamber behaves as though having a negative temperature coefficient.

A known method of correcting for the effect of temperature changes involves the use of two ionization chambers arranged in circuit so that the current from the one ionization chamber is compensated by the current from the other ionization chamber. In order to measure the thickness of an absorber, a known absorber is placed at one ionization chamber, while an unknown absorber is placed into the radiation path at the other ionization chamber. The difference between the two absorbers is given by the difference between the two ionization chamber currents. A known disadvantage of such an arrangement lies in the fact that it is very difficult to maintain the same temperature at the two different points of absorption. This makes actual compensation of the atmospheric temperature influence almost impossible. Furthermore, such an arrangement would be very complicated in construction and consequently very difficult to operate. The purpose of the present invention lies in the development of a more suitable ionization chamber circuit layout, which overcomes these difficulties. This is mainly realized by using a method in which current from a single ionization chamber flows via a resistor of large resistance.

According to the present invention, the resistance connected into ionization chamber circuitry is selected to have an over-all negative temperature coefficient equal to the aforesaid negative temperature coefficient of the ionization chamber, for the purpose of temperature compensation. Preferably this resistance connected into the ionization chamber circuit is divided into two resistors, the first of which is independent of its surrounding or atmospheric temperature and thus effectively has a zero temperature coefficient, while the second is dependent on said atmospheric temperature and has a temperature coefficient more negative than that of the ionization chamber. The two resistors are proportioned so as to have an over-all combined coefficient equal to that of the chamber, whereby the voltage division between chamber and the combined resistance of the two resistors is rendered independent of temperature and dependent only on the thickness or density of the material. The potential differential across these two resistors provides a measure of the weight per unit area of the material. The independency of the first resistor from the atmospheric temperature can be obtained for instance by placing said resistor into a thermostat. The second resistor which is subjected to atmospheric temperature is disposed as close as possible to the measuring point for which temperature compensation is desired. For best results the second resistor should have as highly negative a temperature coefficient as is acceptable for resistors of large resistance. Assuming the ambient temperature drops, increased absorption of radiation by the air takes place and this in turn tends to decrease the potential differential across the two resistors. As a result of the low temperature however the resistance of the resistor in close proximity to the source increases to maintain the potential differential constant thereby completing the process of compensation. The resistance ratio of the two resistors is with a given temperature coefficient of the second resistor determined by the effective coefficient of the equivalent resistance of the ionization chamber which in turn is determined by the separating distance between the source of radiation and the ionization chamber. By properly proportioning the resistors in accordance with the present invention, proper compensation can be attained for any desired distance.

The drawing is a diagrammatic illustration of ionization chamber circuitry arranged in accordance with my invention.

Referring to the drawing, radiation from radiation source 1 enters ionization chamber 3. On their travel to said chamber the rays from source 1 penetrate air column 2 and a material 8 for measurement. The radiation is attenuated while propagating in the air 2 and in the material 8 due to absorption. Upon penetration of the radiation into the ionization chamber 3, a current flows through the ionization chamber under the influence of a voltage source such as battery 4. This current also flows through resistors 5 and 6. Resistor 5 is under the influence of the atmospheric temperature and has a negative temperature coefficient. Resistor 6, on the other hand, is not influenced by the surrounding air, since its temperature is controlled as for example by housing it in a thermostat, illustrated in the drawing by the broken line 9. With the resistors properly proportioned, the voltage 7 across resistors 5 and 6 is a measure of the weight per unit area of the material regardless of temperature. In the case of a moving strip of material of constant density this voltage provides a measure of the thickness over the length of the material, and such voltage may be utilized in a well known manner to provide indications representing deviations in thickness from a predetermined value on a suitable instrument.

An ambient temperature change results in a slight change in the absorption of radiation by air column 2, and a slight change in the value of resistance 5 so that voltage 7 remains constant. If however the thickness of material 8 changes, a change of voltage 7 is realized, as intended and desired. The described method of compensation is obviously very simple in application and effect. A resistor of large resistance which is always necessary is merely divided into two parts of which but one part is subjected to the ambient temperature, such part having a negative temperature coefficient. It will be appreciated that the entire resistance, i.e. as one unit, can of course also be used for compensation in cases where the temperature coefficient measures favorably for the given air column.

It should be understood that this invention is not limited to specific details of construction and arrangement thereof herein illustrated, and that changes and modifications may occur to one skilled in the art without departing from the spirit of the invention.

What is claimed is:

1. Apparatus for measuring the thickness or density of continuously produced strip material comprising a single source of radiant energy and a single radiation detector, said source being disposed so that the material to be measured is subjected to penetrative radiation therefrom and said detector being disposed in operative relation to said material and said source for receiving radiation unabsorbed by said material, and means responsive to variation in an ambient atmospheric condition for automatically compensating variation in gap medium absorption due to change in mass of the gap medium between said source and said detector.

2. Apparatus for measuring the thickness or density of continuously produced material in strip form comprising a source of penetrative radiation, a radiation detector separated from said source by a column of a medium having a characteristic density variable with changes in an ambient atmospheric condition and disposed in operative relation to said material for reception in said detector of radiation variably unabsorbed by said material and column according to respective changes in mass thereof, means in circuit with said detector for producing in said circuit an electrical signal variable in accordance with variations in received radiation including circuit means subject to said changes in atmospheric condition and variable in accordance therewith, the coefficient of variability of the last-named circuit means being so selected with reference to said density characteristic as to render said signal substantially independent of variations in absorption of radiation by said column and dependent substantially solely on the thickness or density of said material.

3. Apparatus for measuring the thickness or density of continuously produced material in strip form comprising a source of penetrative radiation, a radiation detector separated from said source by a column of a medium having a characteristic density variable with changes in ambient temperature and disposed in operative relation to said material for reception in said detector of radiation variably unabsorbed by said material and column according to respective changes in mass thereof, means in circuit with said detector for producing in said circuit an electrical signal variable in accordance with variatons in received radiation including circuit means subject to said temperature changes and variable in accordance therewith, the temperature coefficient of the last-named circuit means being so selected with reference to said density characteristic as to render said signal substantially independent of variations in absorption of radiation by said column and dependent substantially solely on the thickness or density of said material.

4. Apparatus for measuring the thickness or density of continuously produced material in strip form comprising a source of penetrative radiation, a radiation detector separated from said source by a column of a medium having a characteristic density variable with changes in an ambient atmospheric condition and disposed in operative relation to said material for reception in said detector of radiation variably unabsorbed by said material and column according to respective changes in mass thereof, a source of operating potential and resistance means in circuit with said detector for producing in said circuit an electrical signal variable in accordance with variations in received radiation, said resistance means including a resistor subject to said temperature changes and having a temperature coefficient of resistance so selected with reference to said density characteristic as to render the overall temperature coefficient of said resistance means substantially equal in magnitude to the temperature coefficient of the equivalent resistance of said detector, whereby said signal is rendered substantially independent of variations in absorption of radiation by said column and dependent substantially solely on the thickness or density of said material.

5. Apparatus for measuring the thickness or density of continuously produced material in strip form comprising a source of penetrative radiation, a radiation detector separated from said source by a column of a medium having a characteristic density variable with changes in ambient temperature and disposed in operative relation to said material for reception in said detector of radiation variably unabsorbed by said material and column according to respective changes in mass thereof, a source of operating potential and resistance means in circuit with said detector for producing across said resistance means a voltage variable in accordance with variations in received radiation, said resistance means including a resistor subject to said temperature changes and variable in accordance therewith, the temperature coefficient of said resistor being so selected with reference to said density characteristic as to render the over-all temperature coefficient of said resistance means equal in magnitude and sign to the temperature coefficient of the equivalent impedance of said detector whereby said voltage is rendered substantially independent of variations in absorption of radiation by said column and dependent substantially solely on the thickness or density of said material.

6. The combination as defined in claim 5 wherein the resistance means comprises a resistor having an effective zero temperature coefficient and wherein the resistor subject to temperature change has a temperature coefficient of a greater magnitude than but of like sign as the temperature coefficient of the equivalent impedance of the detector.

7. The combination as defined in claim 5 wherein the resistance means comprises a resistor whose temperature is maintained substantially constant and wherein the resistor subject to temperature change has a temperature coefficient of greater magnitude than but of like sign as the temperature coefficient of the equivalent impedance of the detector.

8. Apparatus for measuring the thickness or density of continuously produced strip material comprising a source of radiant energy and a radiation detector, said source being disposed so that the material to be measured is subjected to penetrative radiation therefrom and said detector being disposed in operative relation to said material and said source for receiving radiation unabsorbed by said material, and means responsive to variation in an ambient atmospheric condition for automatically compensating variation in gap medium absorption due to change in mass of the gap medium between said source and said detector, the last-mentioned means including a device disposed close to the point of measurement of said material and responsive to said atmospheric condition for causing said last-mentioned means to provide said compensation.

9. Apparatus according to claim 8, wherein the aforesaid atmospheric condition responsive means and device are responsive to ambient temperature variations.

10. Apparatus according to claim 1, wherein the aforesaid atmospheric condition responsive means is responsive to ambient temperature variation.

References Cited in the file of this patent
UNITED STATES PATENTS

| | | |
|---|---|---|
| 2,213,085 | Faus | Aug. 27, 1940 |
| 2,608,604 | Hart | Aug. 26, 1952 |
| 2,759,089 | Ellis | Aug. 14, 1956 |
| 2,800,591 | Gilman | July 23, 1957 |